Oct. 20, 1942.   F. JOHNSON ET AL   2,299,392
SPRING SHACKLE CONSTRUCTION
Filed Nov. 18, 1940

INVENTORS.
Frank Johnson
Dale Roeder
BY Colvin C. McRae
ATTORNEY

Patented Oct. 20, 1942

2,299,392

UNITED STATES PATENT OFFICE 2,299,392

SPRING SHACKLE CONSTRUCTION

Frank Johnson, Detroit, and Dale Roeder, Wayne, Mich., assignors to Ford Motor Company, Dearborn, Mich., a corporation of Delaware Application November 18, 1940, Serial No. 366,070

8 Claims. (Cl. 267—54)

The object of our invention is to provide a spring shackle construction of simple, durable and inexpensive construction.

A further object of our invention is to provide a spring shackle construction which may be more readily assembled to a motor-vehicle frame and which will be more secure in its assembled position against all forces which might cause the shackle to become disconnected than other shackles known to the applicants.

Still a further object of our invention is to provide improved means for using the well-known screw threaded type of shackle bearing so that the installation of this type of bearing will be facilitated.

With these and other objects in view, our invention consists in the arrangement, construction and combination of the various parts of our improved device, as described in this specification, claimed in our claims, and illustrated in the accompanying drawing, in which:

Figure 1:
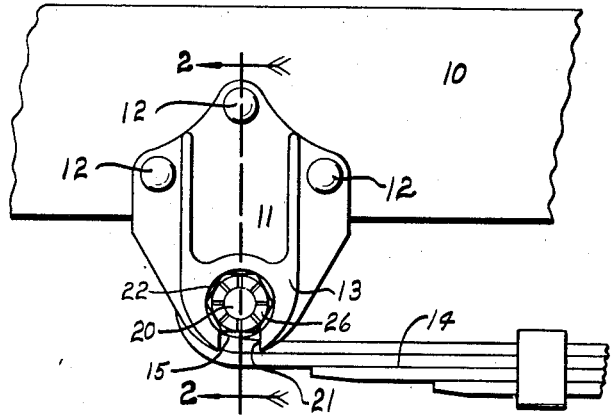
Figure 1 is a side elevation of a portion of a motor-vehicle chassis showing our improved spring shackle construction.
Figure 2:
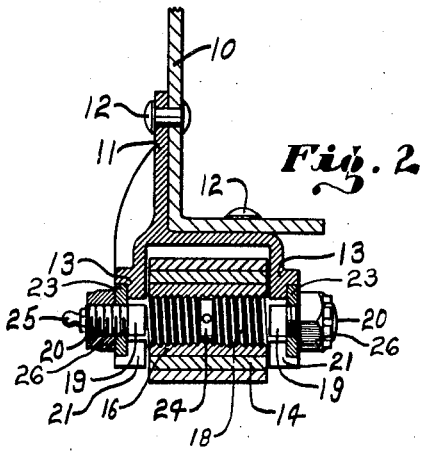
Figure 2 is a sectional view, taken upon the line 2—2 of Figure 1.
Figure 3:
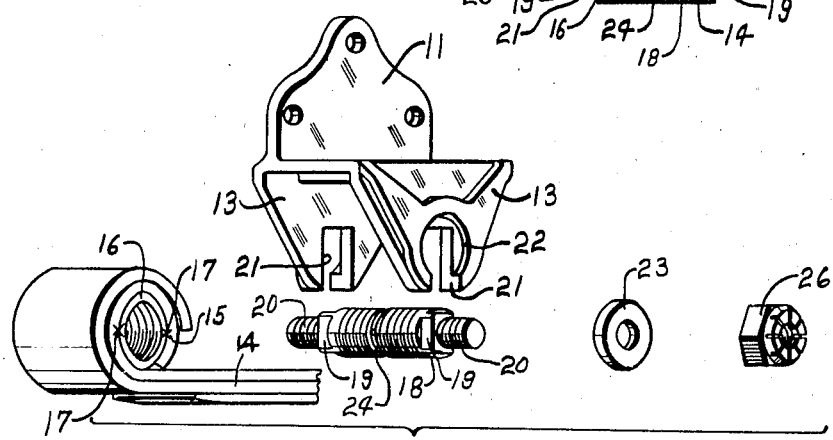
Figure 3 is a perspective exploded view of the spring hanger, shackle bolt, spring eye, retaining washer and clamping nut, to better illustrate the method of assembling the various parts together.

Referring to the accompanying drawing, we have used the reference numeral 10 to indicate one of the side members of a vehicle frame to which a bracket 11 is secured by rivets 12. The bracket 11 functions as a spring hanger and is formed as an L-shaped casting having a pair of arms 13 extending downwardly therefrom, which arms are laterally spaced to straddle the end of a leaf spring 14. The end of the spring 14 is bent to form a spring eye 15 in which a screw threaded steel bushing 16 is fixedly secured. It is essential that end motion between the spring eye and the bushing 16 be prevented and to accomplish this the metal of the bushing and spring eye are arc welded together as shown at 17 in Figure 3.

A spring shackle bolt 18 is provided, which bolt is exteriorly threaded along its intermediate portion, the thread being of sufficient length that when the bolt is threaded into the bushing 16 the threaded ends will extend slightly beyond each end of the bushing. The threaded portion is just long enough to be inserted between the arms 13 of the spring hanger.

The bolt 18 is provided with squared portions 19 at each end of the intermediate threaded portion and the end portions 20 are of reduced diameter and are each threaded to receive a standard nut. The center portions of the intermediate threads are relieved, as shown at 24, to form a lubricant chamber which is connected to a grease fitting 25 by suitable drilled openings in the bolt.

Each of the arms 13 is provided with a slot 21 therein which extends from the bottom of each arm upwardly about half its length. These slots are of sufficient width that the squared portions of the bolt 18 may snugly fit therein.

Our invention is in the means for retaining the bolt 18 in a fixed position in the hanger against all forces which might cause the bolt to loosen. To retain the bolt in such position we have provided annular counterbores 22 in the outer faces of the arms 13, which counterbores are axially aligned with the center of the bolt 18 when it is inserted to the upper ends of the slots 21. Washers 23 are assembled over the outer ends of the bolt and moved into these counterbores to thereby prevent the removal of the bolt from the slots 21. The squared portions 19 are not quite long enough to extend through to the bottom of the counterbores when the bolt is in this position.

In assembling our spring construction the bushing 16 is first secured in the spring eye 15, then the bolt is threaded into the bushing with the squared portions extending from each side of the spring. The spring is then moved to position beneath the frame with the spring eye directly beneath the arms 13 and the bolt rotated sufficiently to align the squares 19 with the slots 21. The spring eye is then moved upwardly so that the squared portions enter the slots 21 and bear against the upper ends of these slots. When the members are in this position the washers 23 are assembled over the threaded ends of the bolt into the counterbores 22 and then nuts 26 are threaded on the reduced end portion of the bolt to securely clamp the washers 23 into the counterbores.

In the past when a threaded type of shackle bolt was used it was necessary to thread the bolt through a threaded opening in the spring hanger and then through the threaded spring bushing and then through another threaded opening in the other arm of the hanger. This required that all of the threads be accurately aligned with each other, i. e., that all three of the threaded members form one continuous thread, otherwise binding occurred. Furthermore, it was necessary to start the thread in a certain position in both the hanger and in the spring eye, as otherwise the spring could not be accurately centered between the spring hanger arms.

Our improved construction has the advantage that the bolt can readily be threaded into a desired position in the spring while it is removed from the hanger, and then the unit inserted into the spring hanger.

Some changes may be made in the arrangement, construction, and combination of the various parts of our improved device without departing from the spirit of our invention, and it is our intention to cover by our claims such changes as may be reasonably included within the scope thereof.

We claim as our invention:

1. A shackle comprising, a pair of laterally spaced arms, said arms having a pair of aligned slots therein extending inwardly from their outer ends, a shackle bolt rotatably mounted in the member being shackled with the ends of said bolt projecting from each side of said member, said bolt having the portions thereof on the respective sides of said member flattened so that said flattened portions may be readily inserted into said slots and will be held against rotation therein by said flattened portions, each of said arms having a counterbore in its outer face in position axially aligned with said bolt when in said slots, washers disposed around said bolt in said counterbores, and means for preventing the removal of said washers from said counterbores, for the purpose described.

2. A vehicle spring shackle comprising, a pair of laterally spaced arms extending downwardly from said vehicle, said arms having a pair of aligned slots therein extending upwardly from their lowermost ends, a shackle bolt rotatably mounted in a vehicle spring eye with the ends of said bolt projecting from each side of said spring eye, said bolt having portions thereof on the respective sides of the said spring eye flattened so that it may be readily inserted in said slot and will be held against rotation therein by said flattened sections, each of said arms having a counterbore in its outer face in position axially aligned with said bolt when assembled in said slots, washers disposed around said bolt in said counterbores, and means preventing the removal of said washers from said counterbores.

3. A vehicle spring shackle construction comprising, a pair of laterally spaced arms extending from said vehicle, said arms having a pair of aligned slots therein extending inwardly from their outer ends, a shackle bolt rotatably mounted in a vehicle spring eye with the end of said bolt projecting from each side of said eye, said bolt having portions thereof on the respective sides of said spring eye machined to a square section, the distance across the flats of said sections being such that said bolt may be readily inserted into said slots and will be held against rotation therein by said squared sections, each of said arms having a counterbore in its outer face in axial alignment with said bolt when assembled in said slots, washers disposed around said bolt in said counterbores, and means which prevents the removal of said washers from said counterbores.

4. A spring shackle construction comprising, a bracket fixed to said vehicle, a pair of laterally spaced arms extending downwardly from said bracket, said arms having a pair of aligned slots therein extending upwardly from their lowermost ends, a shackle bolt rotatably mounted in a vehicle spring eye with the ends of said bolt projecting from each side of said eye, said bolt having the portions thereof on the respective sides of said spring eye each machined to square section, the distance across the flats of said squared sections being such that said bolt may be snugly inserted in said slots and will be held against rotation therein by said squared sections, each of said arms having an annular counterbore in its outer face in position axially aligned with said bolt when the bolt is assembled in said slots, washers disposed around said bolt within said counterbores, and nuts threaded over the outer ends of said bolt which prevent the removal of said washers from said counterbores.

5. A connection for a vehicle spring comprising, a bracket fixed to the underside of said vehicle, said bracket having a pair of laterally spaced arms extending downwardly therefrom, and said arms having a pair of aligned slots extending upwardly from their lowermost ends, a shackle bolt screw threaded in a vehicle spring eye with the ends of said bolt projecting from each side of said eye, said bolt having portions thereof adjacent to the respective sides of said spring eye flattened, the distance across the flats of said portions being such that said bolt may be snugly inserted into said slots and will be held against rotation therein by said flattened portions, each of said arms having an annular counterbore in its outer face in axial alignment with said bolt when the bolt is assembled in said slots, washers disposed around said bolt in said counterbores, and nuts threaded over the outer ends of said bolt which prevent the removal of said washers from said counterbores.

6. A spring shackle construction comprising, a spring support, a pair of laterally spaced arms extending away from said support, said arms having a pair of aligned slots extending inwardly from their outer ends, a shackle bolt having its intermediate portion screw threaded, a correspondingly screw threaded bushing mounted for easy helical rotation upon said intermediate portion of said bolt, said bushing being fixedly secured in a spring eye in one end of a leaf spring, said bolt having the portions thereof adjacent to the respective sides of said spring eye machined to square sections so that said bolt may be snugly inserted into said slots with said bushing and spring disposed between said arms, each of said arms having an annular counterbore in its outer face in axial alignment with said bolt when assembled in said slot, washers disposed around said bolt in said counterbores, and nuts threaded over the outer ends of said bolt which prevent the removal of said washers from said counterbores.

7. A spring shackle comprising, a spring support, a pair of laterally spaced arms extending away from said support, said arms having a pair of aligned slots extending inwardly from their outer ends, a shackle bolt having an enlarged intermediate screw threaded portion, a correspondingly threaded bushing mounted for easy helical rotation upon the intermediate portion of said bolt with the ends of said bolt projecting from each side of said bushing, said bushing being fixedly secured in a spring eye in one end of a leaf spring, said bolt having the portions thereof adjacent to the respective sides of said spring machined to square sections, the distance across the flats of said squared sections being such that said sections may be readily inserted into said slots and will be held against rotation thereby, each of said arms having an annular counterbore in its outer face in axial alignment with said bolt when the bolt is assembled in said slots, washers disposed around said bolt within said counterbores, and nuts threaded over the outer ends of said bolt which prevent the removal of said washers from said counterbores.

8. A shackle comprising, a pair of laterally spaced arms, said arms having a pair of aligned slots therein, said slots extending to an edge of said arm, a shackle bolt, portions of the ends of said bolt being of such surface conformation that said portions are freely received throughout said slots, other portions of said ends having a conformation co-operating with said slots to prevent relative rotation of the bolt with respect thereto, shoulders adjacent each end of said bolt, each of said arms having a counterbore in its outer face in position axially aligned with said bolt when in said block, retaining means disposed around said bolt in said counterbore and bearing against said shoulder, and means for preventing the removal of said retaining means from said counterbore.

FRANK JOHNSON.
DALE ROEDER.